(12) United States Patent
Miller et al.

(10) Patent No.: US 9,517,971 B2
(45) Date of Patent: Dec. 13, 2016

(54) DUAL-COLOR COATING OF OPTICAL FIBERS WITH UV CURABLE INKS

(71) Applicant: Teldor Cables & Systems Ltd., Kibbutz Ein Dor (IL)

(72) Inventors: David Miller, Carmiel (IL); Tuvia Liberman, Kfar-Tavor (IL)

(73) Assignee: Teldor Cables & Systems Ltd., Kibbutz Ein Dor (IL)

( * ) Notice: Subject to any disclaimer, the term of this patent is extended or adjusted under 35 U.S.C. 154(b) by 163 days.

(21) Appl. No.: 14/183,627

(22) Filed: Feb. 19, 2014

(65) Prior Publication Data
US 2015/0259246 A1    Sep. 17, 2015

Related U.S. Application Data

(60) Provisional application No. 61/766,209, filed on Feb. 19, 2013.

(51) Int. Cl.
C03C 25/10      (2006.01)
G02B 6/02       (2006.01)

(52) U.S. Cl.
CPC ............. C03C 25/1065 (2013.01); G02B 6/02 (2013.01)

(58) Field of Classification Search
CPC .............................. G02B 6/02; C03C 25/1065
See application file for complete search history.

(56) References Cited

U.S. PATENT DOCUMENTS

| | | | |
|---|---|---|---|
| 6,470,128 B1 | 10/2002 | Khudyakov et al. | |
| 6,630,242 B1 * | 10/2003 | Lin | C03C 25/102 385/114 |
| 6,849,333 B2 * | 2/2005 | Schissel | C03C 25/106 385/123 |
| 6,904,212 B2 * | 6/2005 | Ma | C03C 25/102 385/123 |
| 6,957,002 B2 * | 10/2005 | Cottevieille | C03C 25/50 385/123 |
| 7,153,115 B2 * | 12/2006 | Leon | C03B 37/02718 261/147 |
| 2002/0164133 A1 * | 11/2002 | Rattazzi | G02B 6/4482 385/100 |

(Continued)

FOREIGN PATENT DOCUMENTS

| | | |
|---|---|---|
| EP | 0501339 | 9/1992 |
| EP | 1069447 | 1/2001 |

(Continued)

OTHER PUBLICATIONS

European Search Report and the European Search Opinion Dated Oct. 29, 2014 From the European Patent Office Re. Application No. 14155699.3.

(Continued)

*Primary Examiner* — Elena T Lightfoot (57) ABSTRACT

A method of coating a silica-silica optical fiber, comprising, in a single pass on a fiber coating machine: applying a primary layer of UV curable acrylate carrying a first color, on said fiber; and applying a second layer of UV curable acrylate carrying a second color different from the first color, on top of the primary layer, the second layer being applied in patterns over the primary layer. The method is used to identify fibers in bundles or loose tubes where there are more fibers than there are basic colors.

11 Claims, 10 Drawing Sheets

(56) References Cited

U.S. PATENT DOCUMENTS

| | | | | |
|---|---|---|---|---|
| 2004/0037521 | A1* | 2/2004 | Xiong | C03C 25/102 385/103 |
| 2005/0184411 | A1* | 8/2005 | Konstadinidis | G02B 6/4438 264/1.27 |
| 2011/0274397 | A1* | 11/2011 | Weimann | C03C 25/1065 385/123 |

FOREIGN PATENT DOCUMENTS

| | | |
|---|---|---|
| EP | 1497237 | 1/2005 |
| JP | 2002-029787 | 1/2002 |

OTHER PUBLICATIONS

Invitation Pursuant to Rule 62a(1) EPC Dated May 26, 2014 From the European Patent Office Re. Application No. 14155699.3.

* cited by examiner

DUAL-COLOR COATING OF OPTICAL FIBERS WITH UV CURABLE INKS

RELATED APPLICATION

This application claims the benefit of priority under 35 USC 119(e) of U.S. Provisional Patent Application No. 61/766,209 filed Feb. 19, 2013, the contents of which are incorporated herein by reference in their entirety.

FIELD AND BACKGROUND OF THE INVENTION

The present invention, in some embodiments thereof, relates to color coating of optical fibers with UV curable inks, and more particularly but not exclusively to an approach to the problem of color coding that allows for distinguishing between more than twelve individual fibers in a bundle.

UV-curable, special coding ink is used for coloring the surface of optical fibers. Optical fibers used in the optical cable require connecting correctly, which means that the same fiber must be identified at both ends. Different colored optical fibers are useful to distinguish between the various optical fibers in the cable. The need for optical fiber identification increases dramatically when optical fiber counts per cable increase from tens to hundreds or even thousands.

For basic coloring, UV-curable ink can provide a quick cure rate, excellent gel resistance, and good adhesion to the surface of the optical fibers. This kind of ink usually consists of a UV-curable prepolymer, pigment or dye, photoinitiator, and other additives.

As long as the number of fibers in a single tube does not exceed 12, a standard color set is available and a single color per fiber per tube is easy to achieve. The present art involves the use of UV-curable inks for coloring optical fibers with a single color for the purpose of visual identification. This is done by adding a thin layer (up to 10 µm) of the UV-curable ink directly on the primary coating of the fiber (o.d. ~245 µm) at processing speeds of 1000-2000 meters/min, or more recently 1500-3000 meters/minute. This is implementable for use in cable units, specifically loose tubes, containing up to 12 fibers requiring different colors for identification. The reason is that there are 12 internationally accepted colors in the standard which is used in most international and regional standards for coloring.

In fact, the relevant commercial ink suppliers in the field have 16 colors, and optical fiber manufacturers are able to put 16 distinct colors in a single tube. However this solution is non-standard.

To enable identification of more than 12 fibers—or in the non-standard case 16—in a cable unit, the present art either involves placing a thin colored filament around each 12-fiber grouping in the cable element, or involves using a solvent based-ink, on top of or below the UV-curable base color, to impart an additional marking e.g. a ring, stripe or hash, of contrasting color. In order to meet the standards required of the colored fiber, the coloring process must not adversely affect the optical performance, attenuation, strippability of the primary coating of the fiber, splice-ability of the fiber or the visual identification, and both the base color and additional marking must be clear, indelible and must not smudge or smear.

The present art can only achieve the above requirements by either adding additional process stages and or/materials through a second coating run, or by adding the filament as a separate stage, or by drastically reducing production speeds to 150-300 meters/min in one process.

Relevant prior art includes U.S. Pat. No. 6,470,128, to Khudyakov, et al. dated Oct. 22, 2002, which discloses a UV-curable coating composition for optical fiber for a fast cure and with improved adhesion to a glass coated optical fiber. Also of relevance is EP1497237 (B1)—optical fiber with reduced attenuation loss, and EP0501339 (B1)—Method of manufacturing color-coated optical fibers.

A relatively modest coloring operation may color over 1 million kilometers of fiber per year, so that the commercial implications of such additional stages are very large.

SUMMARY OF THE INVENTION

The present embodiments may provide a coloring material and a coating application device that allow for the addition of primary and secondary colors in a single high-speed coloring process.

According to an aspect of some embodiments of the present invention there is provided a method of coating a silica-silica optical fiber, comprising, in a single pass on a fiber coating machine:

applying a primary layer of UV curable acrylate, on the layer carrying a first color; and applying a second layer of UV curable acrylate on the primary layer, the second layer carrying a second color different from the first color.

In an embodiment, the primary layer is applied continuously over the fiber, thereby to color the fiber continuously with the first color.

In an embodiment, the second layer is applied in a plurality of patterns to differentiate between different fibers having a same first color, the plurality of patterns including a null pattern.

In an embodiment, the first color is one of twelve different colors.

In an embodiment, lengths of the fiber are bundled and placed in loose tubes such that each loose tube contains a first group of twelve fibers with each of the different first color respectively and a null pattern of the second color, and additional fibers with each of the first color respectively and a first non-null pattern of the second color.

In an embodiment, the loose tube contains more than twelve of the additional fibers, the tube being provided with a second non-null pattern of the second color.

An embodiment may comprise applying UV curing between applying the primary layer and applying the second layer.

An embodiment may involve applying for the primary layer a UV curable acrylate having a viscosity sufficiently high to avoid color mixing when applying the second layer.

An embodiment may comprise applying for the primary layer a UV curable acrylate having a viscosity sufficiently high combined with the UV curing to avoid color mixing when applying the second layer.

An embodiment may comprise feeding the silica-silica optical fiber at a rate of at least a thousand meters per minute.

An embodiment may comprise defining a relationship between a viscosity of the first color layer and a viscosity of the second color layer, the relationship being optimized to minimize color mixing when applying the second color layer over the first color layer.

According to a second aspect of the present embodiments there is provided a method of coating a silica-silica optical fiber, comprising, in a single pass on a fiber coating machine:

applying a primary layer of UV curable acrylate on a first part of the first layer, the primary layer carrying a first color; and applying a second layer of UV curable acrylate on a second part of the first layer, the second layer carrying a second color different from the first color.

According to a third aspect of the present embodiments there is provided a machine for single pass coating of a silica-silica optical fiber comprising:

a first die for pressure application of a first continuous color coating on the fiber;

a second die, downstream of the first die, for pressure application of a second color coating over the first coating; and a UV curing region between the first and second dies, the UV curing region comprising a UV source for applying UV energy to the coatings.

According to a fourth aspect of the present invention there is provided a machine for single pass coating of a silica-silica optical fiber comprising:

a first die for pressure application of a first uniform color coating on the fiber;

a second die, downstream of the first die, for pressure application of a second color coating over the first coating; and wherein at least one of the first and second dies is larger than the first die to accommodate a different viscosity material for the pressure injection.

There may be a predefined relationship between a viscosity of the first color coating and a viscosity of the second color coating, the relationship being selected to minimize smudging between the first and second coatings upon application of the second coating.

According to a fifth aspect of the present invention there is provided a machine for single pass coating of a silica-silica optical fiber comprising:

a first injection needle for pressure application of a first continuous color coating on the fiber;

a first die, downstream of the first die, for pressure application of a second color coating over the first coating; and wherein the first and second dies are positioned to ink opposite sides of the optical fiber.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to color coating of optical fibers with UV curable inks, and more particularly but not exclusively to an approach to the problem of color coding that allows for a single-pass high speed coating process that provides multi-colored or colored and marked fibers, so as to allow for distinguishing between more than twelve individual fibers in a bundle.

The present embodiments relate to the use of an acrylic based UV-curable ink for additional marking in a secondary color during the same base coloring process, while as far as possible maintaining present line speeds, (typically 1000-2000 meters/min). The secondary coloring is achieved without impairing visual identification or negatively affecting attenuation in the fiber. The embodiments comprise a combination of identifying a chemical base of the UV-curable ink and modifying the processing equipment used in the present art such that it is able to apply two inks at once and not just the one base color presently achievable in the present art.

One embodiment relates to a secondary color that is readily visibly discerned, however additional embodiments relate to a secondary color that can be discerned only upon slightly bending, twisting or illuminating the fiber etc.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1A:
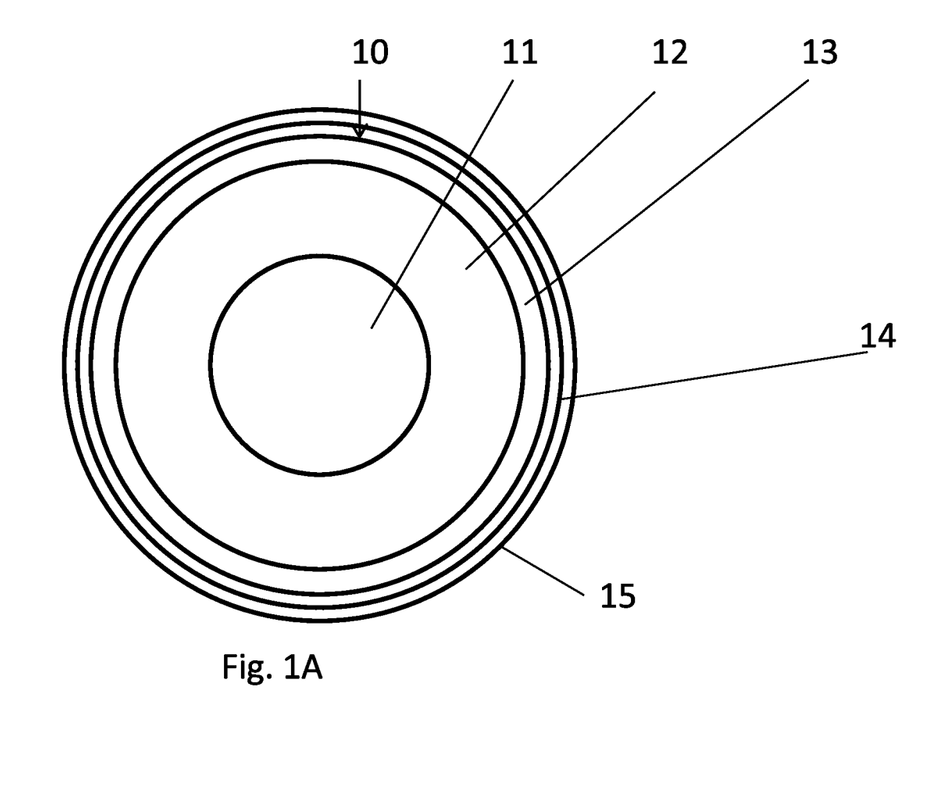
FIG. 1A is a simplified cross-sectional diagram of an optical fiber showing core, cladding and a dual-layer primary coating according to the known art, as well as a third coating layer with a second color, according to embodiments of the present invention.

Referring now to the drawings, FIG. 1A illustrates a silica-silica optical fiber. Optical fiber 10 may be of a conventional construction. Thus, as shown in FIG. 1, a fiber includes an optical fiber core 11 of silica, a cladding 12 thereover, and a colorless primary coating layer 13 over the cladding. The primary coating is typically urethane acrylate. A first, colored coating layer 14, which is also UV curable and acrylate based, is applied over the colorless primary coating layer. The first, colorless primary coating 13 may itself include two layers, and the first colored ink layer 14 may then be imparted on the outer of the two primary layers. Generally, acrylate is used as the first colored ink layer because it has the correct mechanical properties, does not interfere with the optical properties and allows for faster application. UV curing is used for the same reason. In accordance with the present embodiments a second colored ink layer 15 is applied over at least part of the layer 14. The second colored ink layer 15 may be applied over only parts of the first colored layer 14, so as to provide a differential coloring system.

It is to be noted that the two colors may be applied as different parts of the same layer so that there are not two independent levels or coats over the whole fiber, and the term layer is to be so construed throughout this document.

Figure 1B:
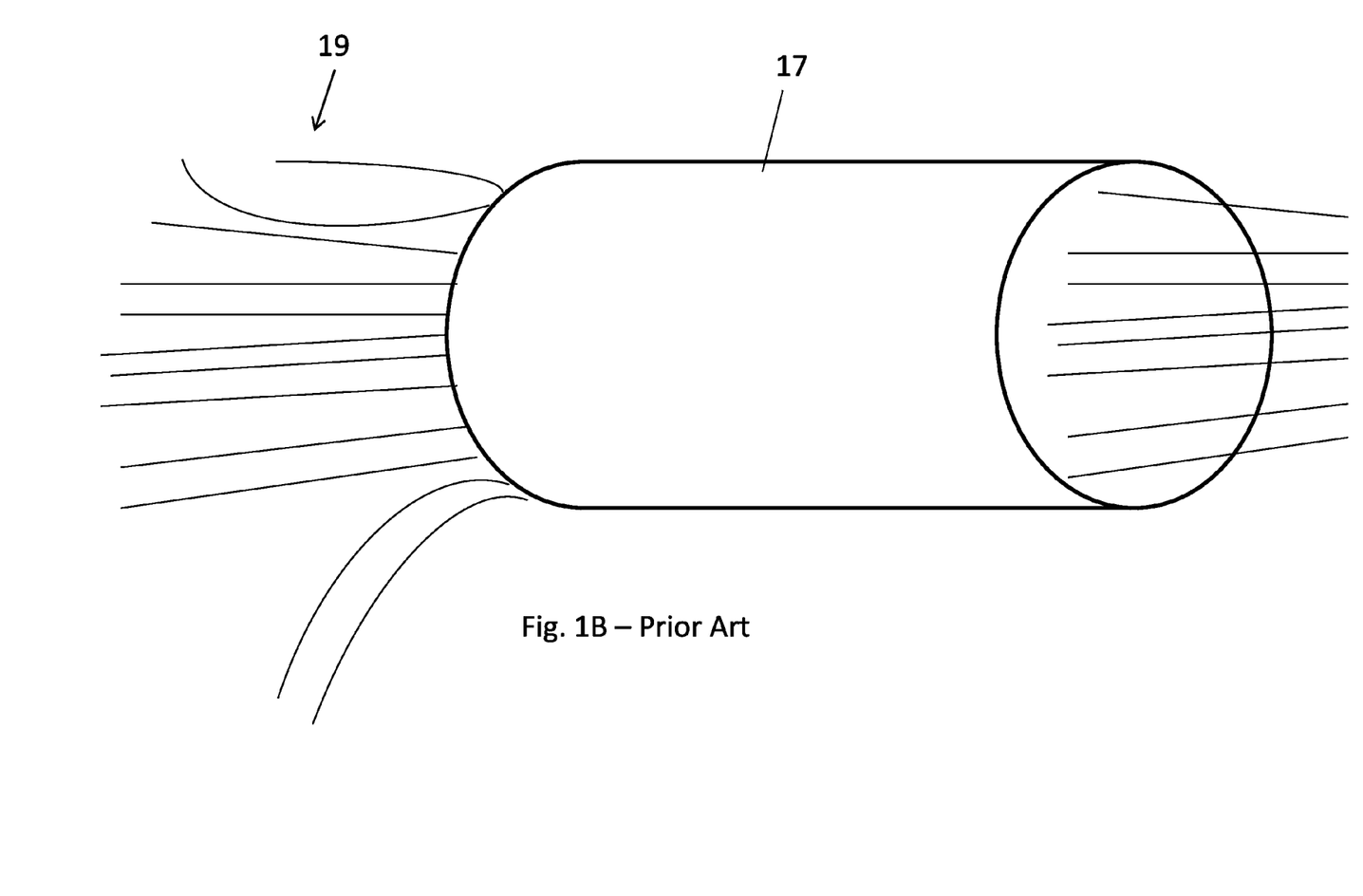
FIG. 1B is a simplified cross-sectional diagram showing a tube with a conventional set of twelve optical fibers extending therefrom and requiring connection or termination.

Reference is now made to FIG. 1B which shows a conventional tube 17 containing twelve optical fibers 19, which extend out of an open end to be connected or terminated. The fibers thus share a common tube in bundles of twelve or more fibers. Multiples of twelve are common, but bundles of 18 or 30 fibers are also common. The present embodiments relate to the challenge, as discussed above, of making the individual fibers identifiable when there are more than twelve fibers sharing the same loose tube. Clear identification is needed for the purpose of correctly connecting or testing the fibers at the terminations, and it is not sufficient that the fibers are visibly different from each other. The differences may need to be such that a technician at one end of the tube can communicate to his colleague at the other end of the tube and describe in unambiguous terms which fiber to test or connect. Thus, different shades of the same color, or different lengths of dashes or different sizes of patterns in general may not be suitable as they may give rise to ambiguities when attempting to distinguish verbally.

Unambiguous differential coloring with a combination of colors on the same fiber or a color plus a clearly differentiated pattern allows each basic color to be used multiple times and still to lead to clear identification.

The present embodiments relate to silica/silica optical fibers, meaning that both the core and cladding are silica/glass. As discussed above, the primary coating is urethane acrylate, and thus the embodiments involve the use of an acrylic based UV-curable ink for additional marking as the secondary color during a coloring process in which base colors are applied.

Figure 2:
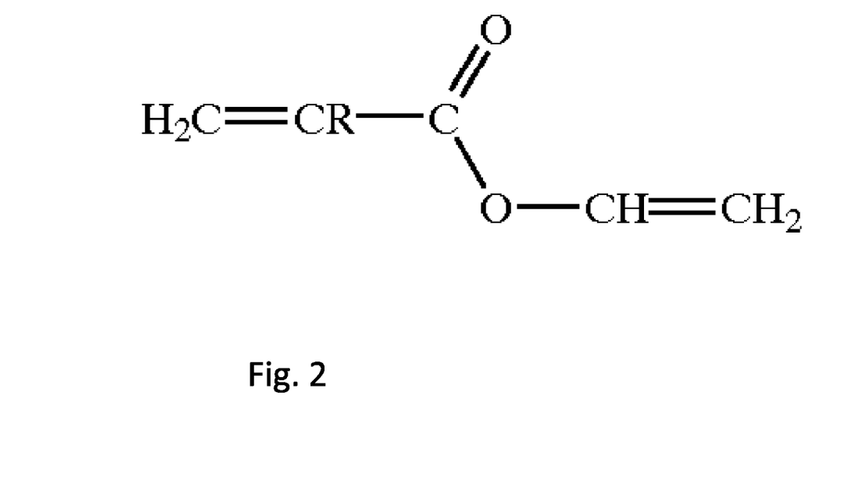
FIG. 2 is a diagram showing an exemplary basic chemical formula for acrylic UV coating materials according to the known art.

There are four families of urethane acrylate commercially used in primary coating of optical fibers, polyester, polyether, polyalkane, and polycarbonate. Each can be found on primary coatings today, and there are monomeric and photometric as well as polymeric options. FIG. 2 shows an example of a generalized urethane acrylate molecule.

The inking process involves the UV curable ink being placed in a vessel and pressurized, then imparted through a die or nozzle onto the fiber as it passes at high speed. The flow rate is measured to effectively coat the fiber. It is not possible to simply impart the two colors together as might be done in digital color printing, as the colors, both uncured, would mix and smudge, and fail to produce clear color coding. Likewise, use of soluble or vaporising inks would cause smudging.

Rather UV curable acrylates may be used, so that advantage can be taken of the curing or viscosity, to allow for a two color process without smudging.

Figure 3:
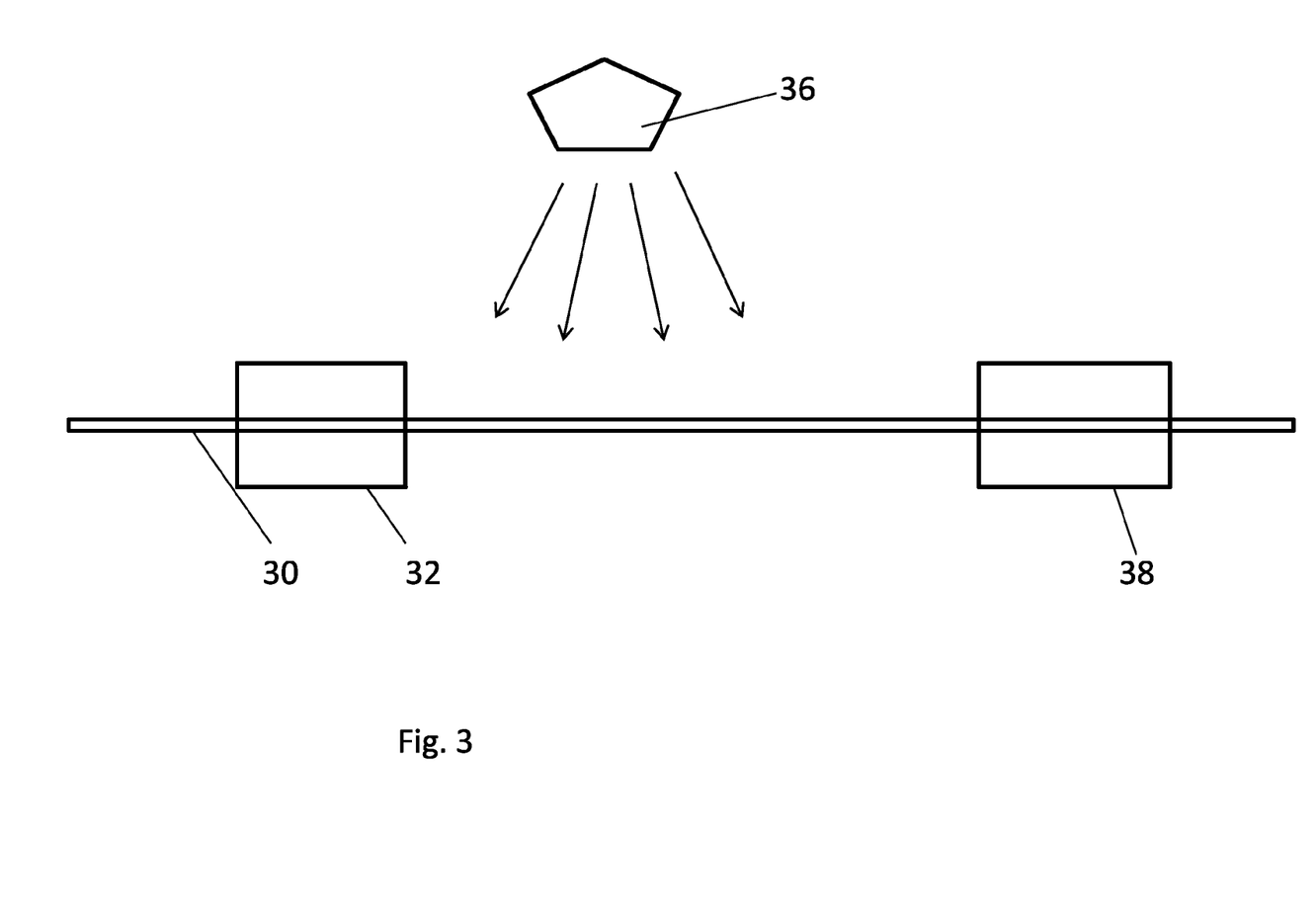
FIG. 3 is a simplified diagram of a single process two color fiber coating machine with UV curing according to a first embodiment of the present invention.

In one embodiment of a two-color process, the coating machine through which the fiber passes has three inking locations, each made up of one or more dies or nozzles. The dies allow for laminar flow of the ink to provide a thin smooth coating, although, as an alternative, injection needles or nozzles could be used. Reference is now made to FIG. 3, which is a schematic block diagram showing a part of a coating machine. An optical fiber 30 passes a first inking location where a die 32 imparts the colored first or primary coat or layer. There is a need to ensure that the layer is provided uniformly around the fiber, so the die optimizes the laminar flow of the ink.

The geometry of the die depends on the coating material, and the fluid dynamics of the coating machine. The different dies may be of different sizes.

A curing region defined by UV curing lamp/s 36 is located downstream of the first inking location. Radiation from the UV curing lamp cures the layers as the fiber continues on its way. The fiber, wet with ink from the first inking point, passes the UV curing area so that the primary color is dried at least sufficiently so as not to cause smudging when the secondary color is applied. The fiber then arrives at a second inking location, downstream of the UV curing lamp, at which a third die 38 imparts a second color partially over the first color to provide a partial covering, preferably in a defined pattern. Thus, after the UV curing area the fiber reaches the second inking point and the secondary color is then applied without smudging.

Figure 4:
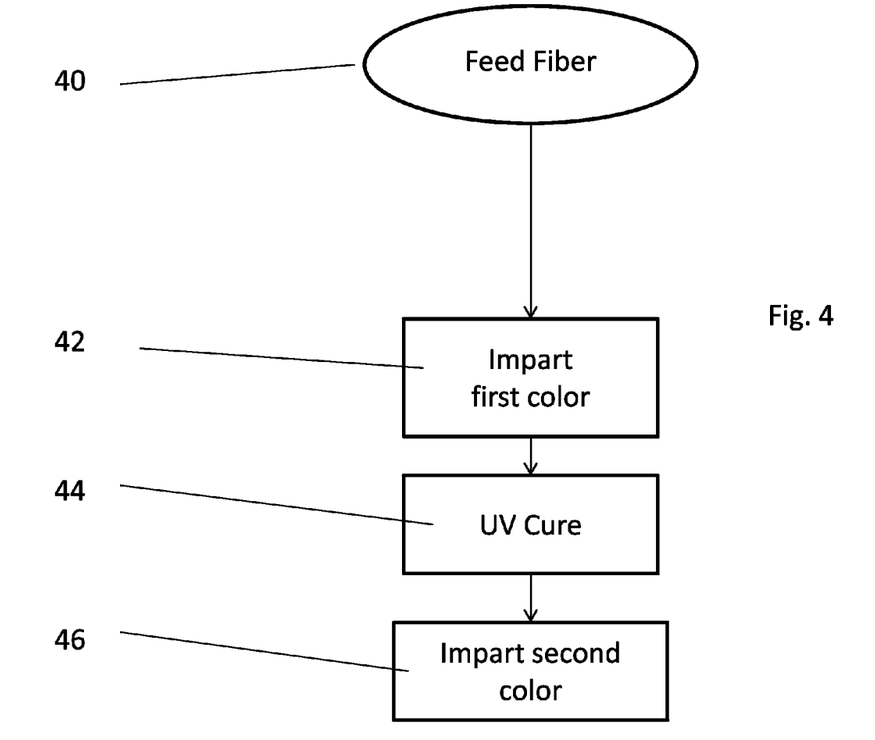
FIG. 4 is a simplified diagram of a process for single operation two color fiber coating using UV curing, according to an embodiment of FIG. 3 and illustrating operation of the machine of FIG. 3.

The length of the UV curing area, or the power of the UV light used in combination with the coloring line speed, does not have to be so long as to completely cure the primary ink. Rather it is only necessary to cure the primary ink sufficiently so that the secondary ink can be imparted without smudging. The procedure is illustrated in FIG. 4, where the fiber is fed in—40, the first color is imparted—42 and then curing is carried out—44. Finally the second color is imparted—46.

Figure 5:
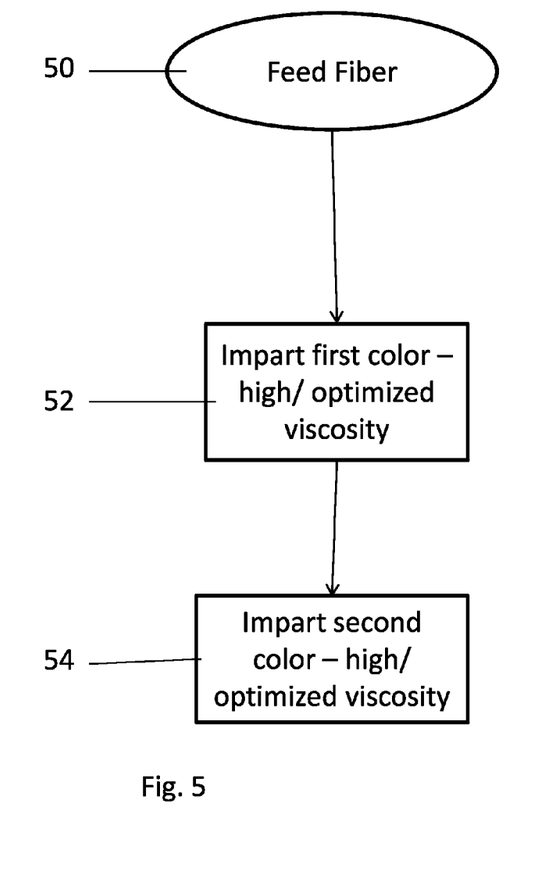
FIG. 5 is a simplified diagram of a process for single operation two color fiber coating using UV coloring inks of raised or optimized viscosity, according to a second embodiment of the present invention.

Reference is now made to FIG. 5, which illustrates another embodiment of the two-color process. In FIG. 5, the fiber is fed as before, 50, then in stages 52 and 54 the first and second layers are imparted with the first and second colors. One or both of the first and second color inks is prepared with an elevated viscosity or the relationship between the viscosities of the two inks is optimized, again to reduce smudging and avoid causing attenuation of the optical signal.

Figure 6:
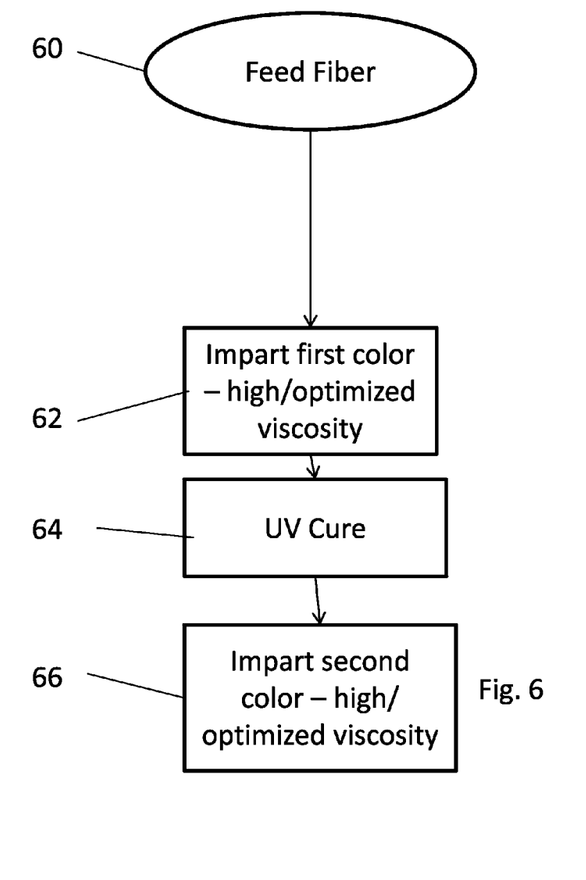
FIG. 6 is a simplified diagram of a process for single operation two color fiber coating using UV coloring inks of raised or optimized viscosity and a curing stage in between, according to a third embodiment of the present invention.

Reference is made to FIG. 6, which illustrates a third embodiment of the two-color process. In this third embodiment the first and second embodiments, of FIGS. 4 and 5 respectively, are combined. The fiber is fed in—60, the first color, prepared as a high viscosity ink, is imparted—62 and then curing is carried out—64. Finally the second color, also prepared as a high viscosity ink, is imparted—66. In a variation, either of the two colors is prepared as a high viscosity ink, but not both. In a further variation, the relationship between the two viscosities of the two inks is optimized to reduce smudging.

Thus, in the third embodiment, two inking points are separated by a UV curing area and an optimized viscosity relationship is used between the two inks or a high viscosity ink is used either for the main or secondary color or preferably for both, so that less UV curing is needed and thus less distance, between the first and second applications of ink.

Line speeds of 1000-2000 meters/min are retained without impairing visual identification or negatively affecting attenuation of the optical fiber. The embodiments comprise a combination of a suitable chemical base of the UV-curable ink and a modification of the processing equipment used in the present art such that it may apply both primary and secondary inks at once. Today, 24 or 36 fibers or any other number may be included in a single bundle or tube. Twelve basic colors are available in the coloring standard, and two secondary markings are needed to indicate second and third sets of twelve fibers, or indeed any fibers beyond the initial twelve.

The secondary markings may be dots or a stripe or rings or patches or hash marks or the like, of any color that shows up in contrast on the primary color. The secondary color may be a color which is not one of the basic colors and which is selected to show up clearly against all the basic colors. Any two different markings or shapes may then be used to distinguish the further groups of twelve. Thus for example, in one group of twelve fibers the secondary color may be applied as a line, and in the second group the secondary color may be applied as a ring. The system is extendable for any number of groups of twelve fibers as long as a unique marking remains available.

In another embodiment the secondary color may be any of the basic colors. For each basic color a contrasting basic color is selected and used as the secondary color. Again any two different markings or shapes are used to distinguish the second and third groups of twelve.

In one embodiment, the secondary color is readily visibly discerned. In additional embodiments the secondary color is discerned only upon slightly bending or twisting the fiber, or illuminating the fiber with visible light, or under IR light or under UV light etc.

Figure 7:
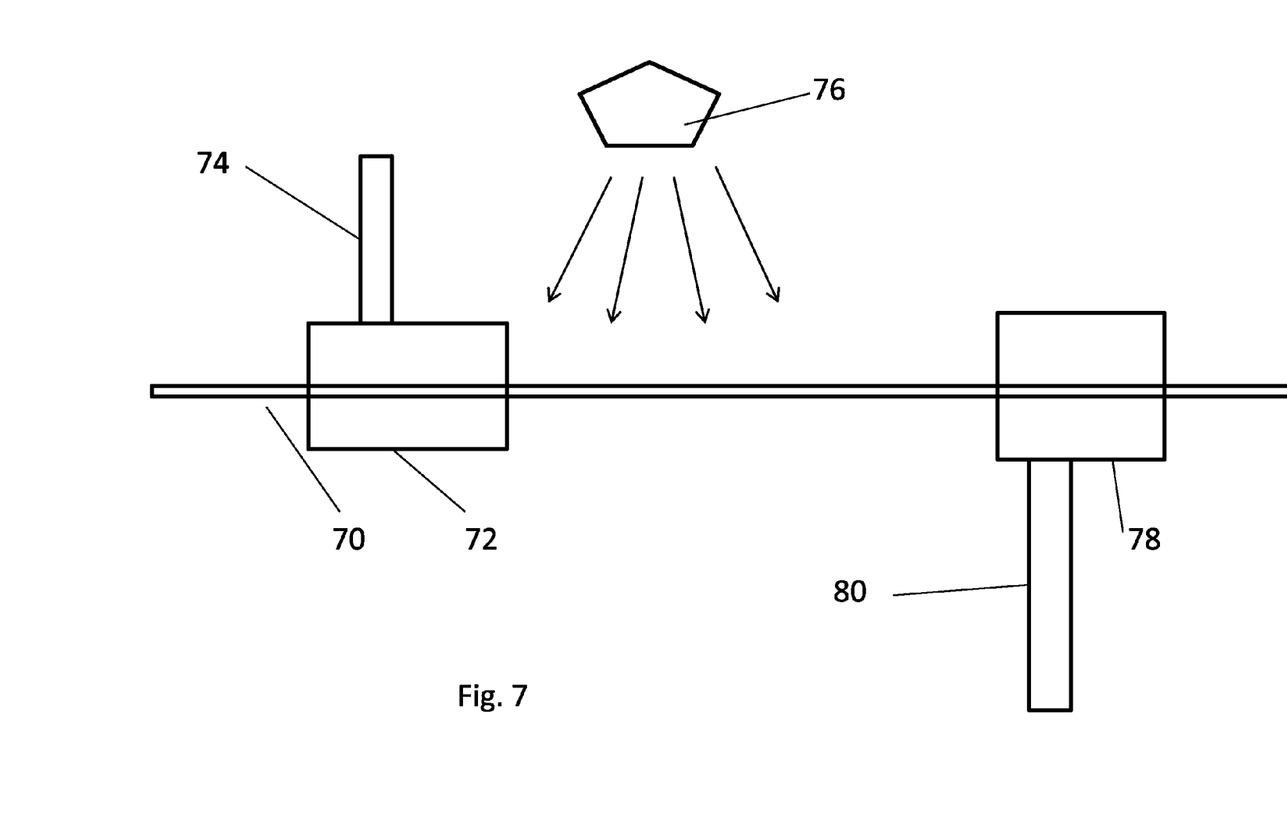
FIG. 7 is a simplified diagram of single process two color fiber coating in which each color is aimed at a separate side of the fiber.

Reference is now made to FIG. 7, which illustrates a further embodiment of the two-color coating machine. An optical fiber 70 passes a first inking or coloring location, as before, where a die 72 imparts the primary or first coat of colored ink. Ink is supplied from one side via an ink supply tube 74. The geometry of the die depends on the coating material, in particular its viscosity, and the fluid dynamics of the coating machine. The different dies may have different geometries.

A curing region defined by UV curing lamp 76 may be located downstream of the first inking location, although in some versions the curing region may be dispensed with in this embodiment. Radiation from the UV curing lamp then cures the layer as the fiber continues on its way. The fiber then arrives at a second inking location, downstream of the UV curing lamp, at which a second die 78 imparts a second color at a second side, opposite the first color, to provide a fiber that has two clear colors, one on each side. The ink is supplied from ink supply tube 80, which is schematically illustrated to be on the opposite side from ink supply tube 74. Either or both of UV curing and high or optimized viscosity ink may or may not be necessary in addition to avoid smudging at the boundaries.

Thus, in the embodiment of FIG. 7, the basic color is imparted on the fiber from one side and the secondary color is imparted on the fiber from the other side, and the nozzles or dies are suitably positioned. UV curing may be carried out. One of the colors is a base color.

Reference is now made to FIG. 8, which illustrates exemplary patterns that may be made with the second color. In FIG. 8a, one or more solid horizontal stripes are used. In FIG. 8b, one or more stripes made up of combinations of dots and dashes are used. Here by way of example the line consists of single dashes separated by two dots. In FIG. 8c, one or more stripes of equal length dashes are used. In FIG. 8d, solid stripes of increased thickness are shown. In FIG. 8e one or more lines of dots are used. In FIG. 8f, stripes of greater thickness are shown. In FIG. 8g, stripes of yet greater thickness are shown, and in FIG. 8h, stripes of even greater thickness are used. Diagonal or spiral or any other suitable patterns may also be used.

Figure 8A:
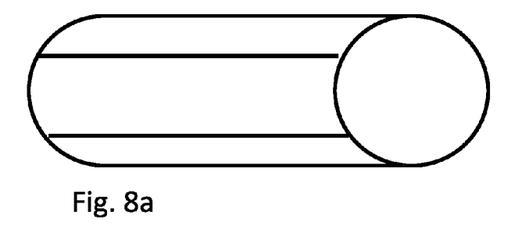
FIGS. 8A-8H are simplified diagrams illustrating assorted markings of the secondary color according to embodiments of the present invention.
Figure 8B:
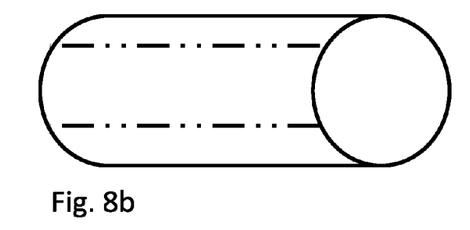
Figure 8C:
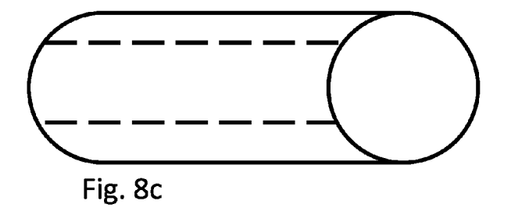
Figure 8D:
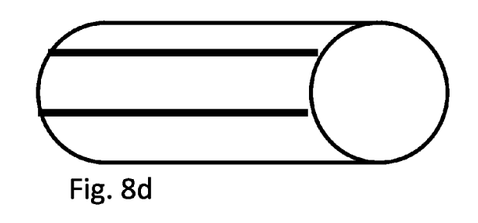
Figure 8E:
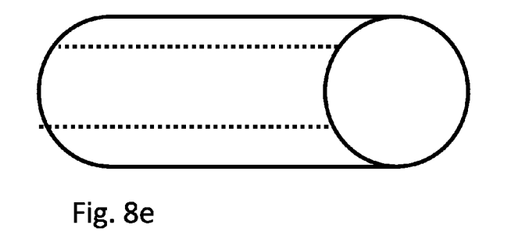
Figure 8F:
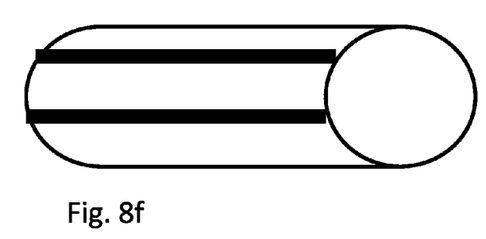
Figure 8G:
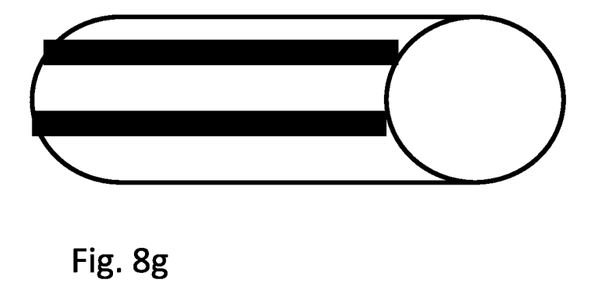
Figure 8H:
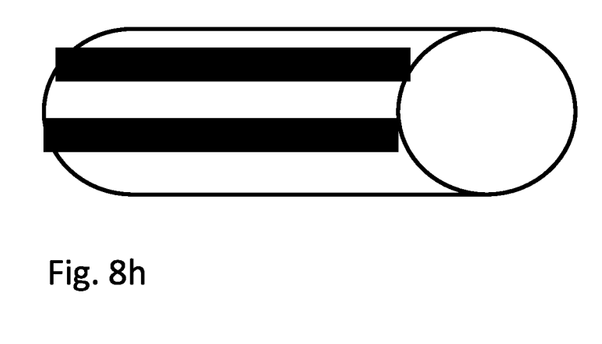

FIGS. 8b, 8c and 8e are examples of non-continuous application of the second color. Such non-continuous coloring may be achieved through intermittent axial application of the lines or stripes.

One consideration in choosing the pattern is that the fiber can be verbally described, so that an operator at one end of the fiber can tell his colleague at the far end which fiber to look for. Thus patterns with unambiguous names such as rings, dots, dashes, or dot-dashes, and stripes are preferred over say different sized patches.

Figure 9:
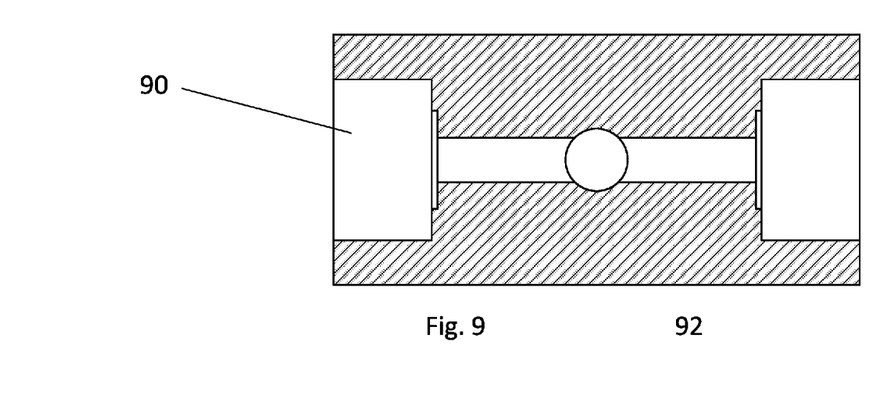
FIG. 9 illustrates a die housing with a die for inserting a single color ink onto a passing fiber.

Reference is now made to FIG. 9, which is a simplified schematic diagram that illustrates a die housing. A die housing 90 incorporates a die 92 for inserting a single color ink onto a passing fiber. Such a die may be used in accordance with prior art systems and may also be used in the present embodiments where application of one color is followed by UV curing before applying a second color.

Figure 10:
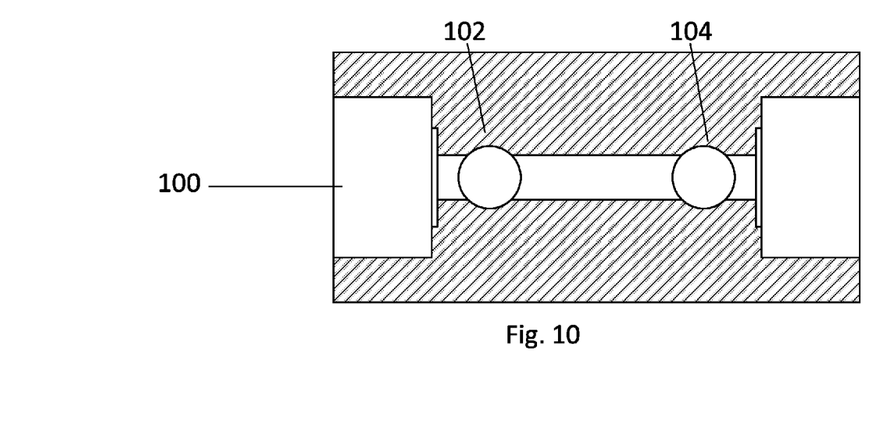
FIG. 10 illustrates a die housing with two dies for inserting two ink colors onto a passing fiber in accordance with an embodiment of the present invention.

Reference is now made to FIG. 10, which illustrates a die housing according to an embodiment of the present invention. Die housing 100 includes two dies, 102 and 104, for inserting two ink colors onto a passing fiber in accordance with an embodiment of the present invention.

One example of a UV-curable, special coding ink that is used for optical fibers consists chiefly of UV-curable prepolymers, coloring materials, and a photoinitiator. The UV-curable prepolymers are silicone epoxy benzoic acrylate (SEBA) and alicyclic hydrocarbon epoxy acrylate (ACEA). The coloring materials depend on the desired color and include disperse red urethane acrylate (RUA), disperse blue urethane acrylate (BUA), acridine yellow urethane acrylate (YUA), and their mixtures. Another example is an aliphatic polyether-based urethane acrylate; a monomer having a plurality of acrylate or methacrylate moieties; an alkyl acrylate or methacrylate; and an optional photoinitiator.

A further example of a UV-curable acrylate ink consists of an acrylate oligomer and a vinyl acrylate compound, the latter of which can act as both a reactive diluent and an adhesion promoter. The vinyl acrylate compounds have good miscibility and low viscosity, and impart to the cured primary coating a high adhesion to glass. With the use of a free radical photoinitiator, the vinyl acrylate compound increases the speed of cure of the uncured primary coating.

Sources of commercially available UV-curable acrylate inks include DSM, Herkula, and Borden.

It is expected that during the life of a patent maturing from this application many relevant pulse shaping and symbol decoding technologies will be developed and the scope of the corresponding terms in the present description are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of using a fiber coating machine for coating a silica-silica optical fiber, the fiber comprising a colorless acrylate dual-layer primary coating over a cladding, the fiber with said cladding and said colorless acrylate dual-layer primary coating being provided by a fiber manufacturer, the method being carried out by an end user of the fiber, the method comprising, providing said fiber comprising a colorless acrylate dual-layer primary coating over a cladding as provided by said manufacturer to said fiber coating machine;

in a single pass on said fiber coating machine:

applying over said colorless acrylate dual-layer primary coating a first layer of UV curable acrylate, said layer carrying a first color; and applying a second layer of UV curable acrylate on said first layer, said second layer carrying a second color different from said first color, thereby providing by said end user two layers of colored UV curable acrylate with two different colors over said colorless acrylate dual-layer primary coating of said fiber as provided by said manufacturer.

2. The method of claim 1, wherein said first layer is applied continuously over the fiber, thereby to color said fiber continuously with said first color.

3. The method of claim 1, wherein said second layer is applied in a plurality of patterns to differentiate between different fibers having a same first color, said plurality of patterns including a null pattern.

4. The method of claim 1, wherein said first color is one of twelve different colors.

5. The method of claim 4, wherein lengths of said fiber are bundled and placed in loose tubes such that each loose tube contains a first group of twelve fibers with each of said different first color respectively and a null pattern of said second color, and additional fibers with each of said first color respectively and a first non-null pattern of said second color.

6. The method of claim 5, wherein said loose tube contains more than twelve of said additional fibers, the tube being provided with a second non-null pattern of said second color.

7. The method of claim 1, comprising applying UV curing between applying said first layer and applying said second layer.

8. The method of claim 1, comprising applying for said first layer a UV curable acrylate having a viscosity sufficiently high to avoid color mixing when applying said second layer.

9. The method of claim 7, comprising applying for said primary layer a UV curable acrylate having a sufficiently high viscosity combined with said UV curing to avoid color mixing when applying said second layer.

10. The method of claim 1, comprising feeding said silica-silica optical fiber at a rate of at least a thousand meters per minute.

11. The method of claim 1, comprising defining a relationship between a viscosity of said first color layer and a viscosity of said second color layer, said relationship being optimized to minimize color mixing when applying said second color layer over said first color layer.

* * * * *